United States Patent
Wang et al.

(10) Patent No.: US 9,561,449 B2
(45) Date of Patent: Feb. 7, 2017

(54) LED LIGHTING DEVICE AND WIRELESS SPEAKER

(71) Applicant: ZHEJIANG SHENGHUI LIGHTING CO., LTD, Jiaxing (CN)

(72) Inventors: Xia Wang, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 14/420,930

(22) PCT Filed: Sep. 3, 2014

(86) PCT No.: PCT/CN2014/085880
§ 371 (c)(1),
(2) Date: Feb. 11, 2015

(87) PCT Pub. No.: WO2015/035874
PCT Pub. Date: Mar. 19, 2015

(65) Prior Publication Data
US 2016/0023124 A1 Jan. 28, 2016

(30) Foreign Application Priority Data
Sep. 12, 2013 (CN) .......................... 2013 1 0416787

(51) Int. Cl.
*H04B 3/00* (2006.01)
*A63J 17/00* (2006.01)
(Continued)

(52) U.S. Cl.
CPC ............... *A63J 17/00* (2013.01); *H04H 60/82* (2013.01); *H04R 3/00* (2013.01); *H04R 27/00* (2013.01);
(Continued)

(58) Field of Classification Search
CPC ........................................................ H03F 3/68
(Continued)

(56) References Cited

U.S. PATENT DOCUMENTS

2011/0121654 A1* 5/2011 Recker ............... H05B 37/0272
307/66
2014/0373123 A1* 12/2014 Kang ...................... H04L 41/22
726/7

FOREIGN PATENT DOCUMENTS

CN   101902669 A   12/2010
CN   103108453 A   5/2013
(Continued)

*Primary Examiner* — Yosef K Laekemariam
(74) *Attorney, Agent, or Firm* — Anova Law Group, PLLC

(57) ABSTRACT

The present invention provides an LED lighting device and a wireless speaker system. The LED lighting device includes an LED power supply circuit configured to power the LED lighting device; an LED light source module configured to emit light, the LED light source being connected to the power supply circuit; a DLNA wireless communication module configured to receive and process audio signals and commands transmitted from a smart terminal, and control the LED lighting device based on the commands received from the smart terminal; an audio power amplifier unit configured to receive processed audio signals from the wireless communication module; and a speaker unit configured to play audio signals received from the audio power amplifier unit, the audio amplifier unit driving the speaker unit based on the signals received from the wireless communication module.

20 Claims, 3 Drawing Sheets

(51) Int. Cl.
    *H05B 37/02*     (2006.01)
    *H04H 60/82*     (2008.01)
    *H04R 3/00*     (2006.01)
    *H04R 27/00*     (2006.01)
    *H05B 33/08*     (2006.01)

(52) U.S. Cl.
    CPC ...... *H05B 33/0845* (2013.01); *H05B 37/0272* (2013.01); *H04R 2227/003* (2013.01); *H04R 2227/005* (2013.01); *H04R 2420/07* (2013.01); *Y02B 20/48* (2013.01)

(58) Field of Classification Search
    USPC ................. 381/28, 57, 58, 77, 85, 120, 122, 123,381/161, 323, 300
    See application file for complete search history.

(56) References Cited

FOREIGN PATENT DOCUMENTS

| | | |
|---|---|---|
| CN | 103108454 A | 5/2013 |
| CN | 103501558 A | 1/2014 |
| CN | 203554727 U | 4/2014 |

\* cited by examiner

LED LIGHTING DEVICE AND WIRELESS SPEAKER

CROSS-REFERENCES TO RELATED APPLICATIONS

This application claims the priority of Chinese Patent Application No. 201310416787.5 filed on Sep. 12, 2013, the entire contents of which is incorporated herein by reference.

FIELD OF THE DISCLOSURE

The present disclosure relates to the field of light emitting diode (LED) technologies and, more particularly, relates to a LED lighting device, a wireless speaker system, and a related method for playing audio files.

BACKGROUND

The Digital Living Network Alliance (DLNA) is a non-profit collaborative trade organization established by Sony in June 2003. It is responsible for defining interoperability guidelines to enable sharing of digital media between multimedia devices. It provides solutions for communications among wired or/and wireless networks formed by various devices, such as personal computers, consumer appliances, and mobile devices. DLNA provides an opportunity for unlimited content sharing and generation of digital content and related services. DLNA does not provide a new technology. Rather, it provides a solution and a technical standard. Therefore, the technologies and protocols included in the DLNA are all well known and well adopted. A DLNA compliant application is often built with five functional components. From the lowest level to the highest level, they are network connectivity, network protocol, content transfer, device discovery, control, and management, and content format.

LED technologies are environmentally friendly. Further, LED technologies provide controllable lighting, solid-state lighting, and lighting devices with long lifespans. LED technologies have been widely adopted in various lighting applications, e.g., public lighting and indoor lighting in offices. The current wireless speakers with LED lighting devices often require an additional wireless transmitter to control and transmit audio data files. However, this type of transmitter is often bulky, costly, and difficult to work with other devices. Such a transmitter is therefore not suitable to be installed in many devices, such as mobile terminals or smart phones.

The disclosed method and system are directed to solve one or more problems set forth above and other problems.

BRIEF SUMMARY OF THE DISCLOSURE

Embodiments consistent with the present disclosure provide an LED lighting device and a speaker system with wireless communication modules supporting DLNA protocols.

One aspect of the present disclosure provides an LED lighting device that can communication with a smart terminal. The LED lighting device includes an LED power supply circuit configured to power the LED lighting device; an LED light source module configured to emit light, the LED light source being connected to the power supply circuit; a DLNA wireless communication module configured to receive and process audio signals and commands transmitted from a smart terminal, and control the LED lighting device based on the commands received from the smart terminal. Further, the LED lighting device includes an audio power amplifier unit configured to receive processed audio signals from the wireless communication module and a speaker unit configured to play audio signals received from the audio power amplifier unit. The audio amplifier unit drives the speaker unit based on the signals received from the wireless communication module. The wireless communication module supports one or more of 2.4 GHz, 5.2 GHz, and 5.8 GHz frequency bands, and full duplex.

Another aspect of the present disclosure provides a wireless speaker system. The wireless speaker system includes an LED lighting device and a smart terminal configured to read and control the status of the LED lighting device. The smart terminal and the lighting device both include a communication module supporting the DLNA protocol. The smart terminal transmits audio signals to the LED lighting device to play the audio. The smart terminal also transmits commands to the LED lighting device to dim the LED lighting device wirelessly. The smart terminal may be a smart phone, a smart television, a tablet, a desktop, etc.

Another aspect of the present disclosure provides a method for playing audio signals and controlling light wirelessly based on DLNA protocol by an LED lighting device. The method includes establishing a connection between a smart terminal and an LED lighting device via DLNA protocols, wherein the smart terminal and the LED lighting device include wireless communication modules supporting the DLNA protocols. The method includes controlling lighting of the LED lighting device based on a command received from the smart terminal and playing audio signals transmitted from smart terminal on the LED lighting device.

Another aspect of the present disclosure provides a wireless multifunctional sound system supporting DLNA protocols. The system includes a number of multifunctional LED lighting devices and a smart terminal configured to monitor and remotely control the multifunctional LED lighting devices. The smart terminal sets a first multifunctional LED lighting device as a central device, and the other multifunctional LED lighting devices as receiving devices. The central device receives control signals or audio signals from the smart terminal and sends the signals to the receiving devices. Further, the smart terminal controls audio broadcasting and light emission of the multifunctional LED lighting devices using DLNA protocols. The multifunctional LED lighting devices and the smart terminal form a mesh network.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
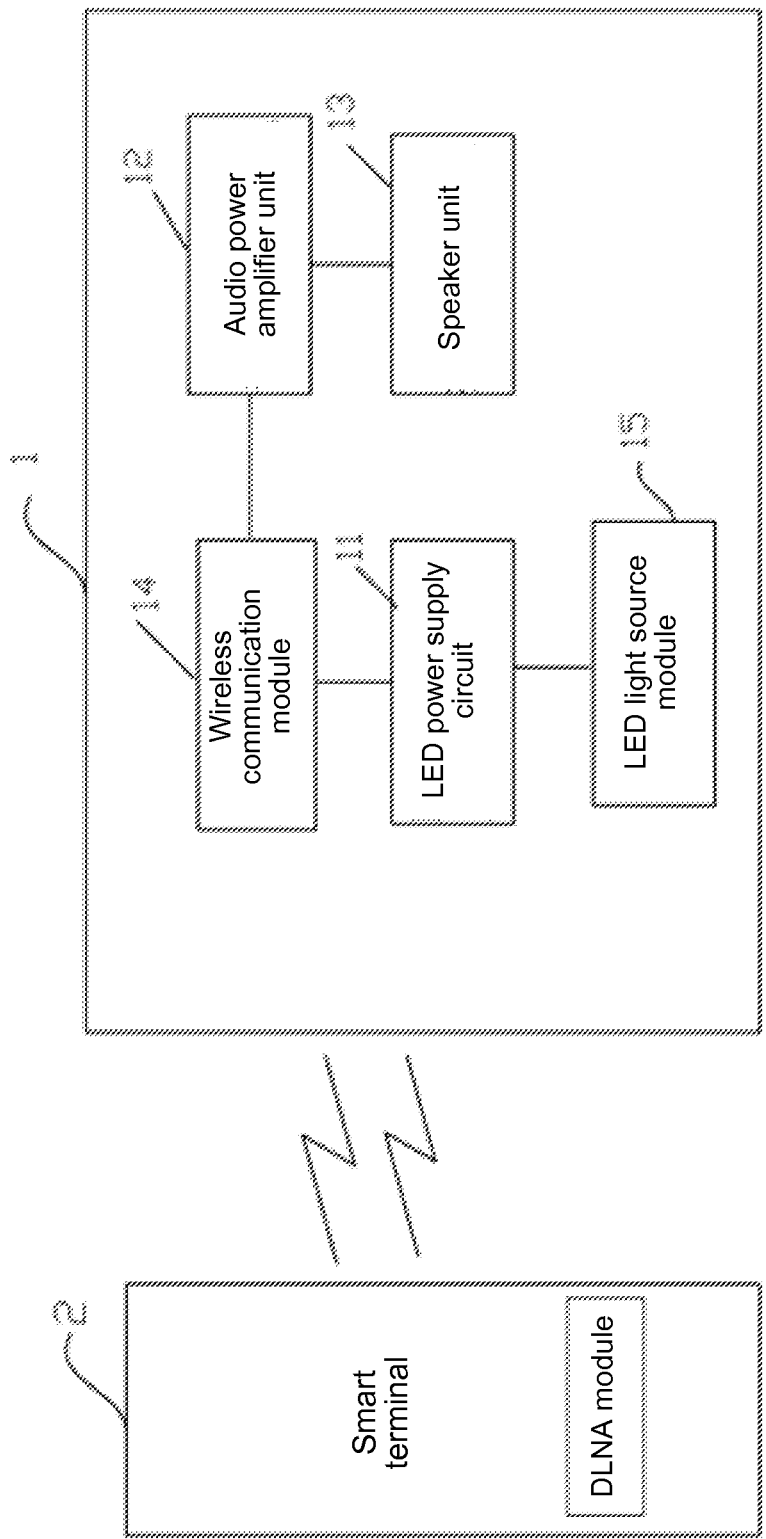
FIG. 1 is a block diagram illustrating exemplary components of a wireless speaker and LED lighting device consistent with the present disclosure.

FIG. 1 shows exemplary LED lighting device components consistent with the present disclosure. As shown in FIG. 1, an LED lighting device 1 includes an LED power supply circuit 11, an audio power amplifier unit 12, a speaker unit 13, a DLNA wireless communication module 14, and an LED light source module 15. The wireless communication module 14 communicates with a smart terminal 2 and communicates with other LED lighting devices 1 simultaneously. The wireless communication module 14 may include a high-performance processor. The LED power supply circuit 11 drives LED light source module 15, and is configured to power the LED lighting device 1.

In operation, the smart terminal 2 transmits digital audio signals and control commands wirelessly to the wireless communication module 14 via its DLNA module. The DLNA module is a wireless communication module supporting the DLNA protocols. After processing the received data, the wireless communication module 14 sends the audio signals and commands to the audio power amplifier unit 12. The audio power amplifier unit 12 is connected with the speaker unit 13. Further, the wireless communication module 14 may transmit feedback data to the smart terminal 2.

The processor in the wireless communication module 14 may be one or more micro-controllers, digital signal processors, and/or digital integrated circuit controllers, which process the input audio signals and commands, and send the processed data to the audio power amplifier unit 12. The audio power amplifier unit 12 connects to the speaker unit 13. Further, the wireless communication module 14 communicates with other wireless communication modules 14 of other LED lighting devices 1.

In addition, the wireless communication module 14 supports one or more of 2.4 GHz, 5.2 GHz, and 5.8 GHz frequency bands, and the combinations thereof. The wireless communication module 14 also supports data transmissions in full duplex (e.g., to and from the smart terminal 2). Further, it may connect to the Internet, may implement remote control functions, and may be used to dim the LED lighting device. Moreover, in the present disclosure, the smart terminal 2 may be a smart phone, a smart television, a tablet, a desktop computer, etc.

Figure 2:
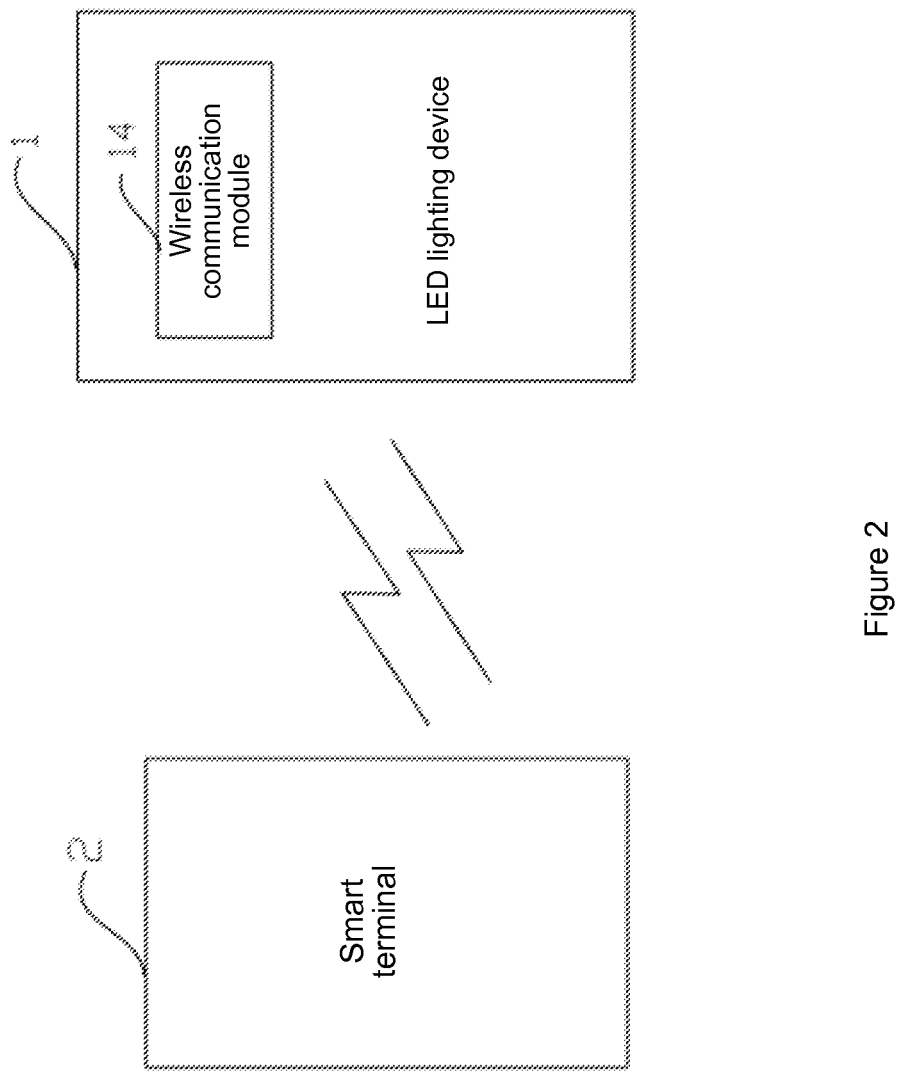
FIG. 2 is a block diagram illustrating an exemplary wireless speaker and LED lighting system consistent with the present disclosure.

FIG. 2 shows exemplary wireless speaker and LED lighting system consistent with the present disclosure. As shown in FIG. 2, a wireless speaker and LED lighting system includes an LED lighting device 1 and a smart terminal 2. Further, a wireless communication module 14 is included in the LED lighting device 1. A DLNA module is included in the smart terminal 2. A link using the DLNA protocol may be established between the smart terminal 2 and the LED lighting device 1 via the wireless communication module 14, so that the smart terminal 2 may transmit audio signals stored in its memory to LED lighting device 1 to play audio files and/or dim the lighting on the LED lighting device 1.

Moreover, the LED lighting device 1 may connect to the Internet following the commands from the smart terminal 2 and send a built-in list of Internet radio stations or playlist of music to the smart terminal 2. The smart terminal 2 may send a play command to the LED lighting device 1. The LED lighting device 1 may then play the Internet radio station or music selected by the smart terminal 2.

When the LED lighting device 1 is connected to the Internet, the smart terminal 2 may transmit audio signals from an Internet radio station or an online music stream to the LED lighting device 1 so that it can play the audio file though the speaker 13. The smart terminal 2 may also extend a USB dongle supporting DLNA protocols to transmit audio signal to the LED lighting device 1 to play audio files.

Figure 3:
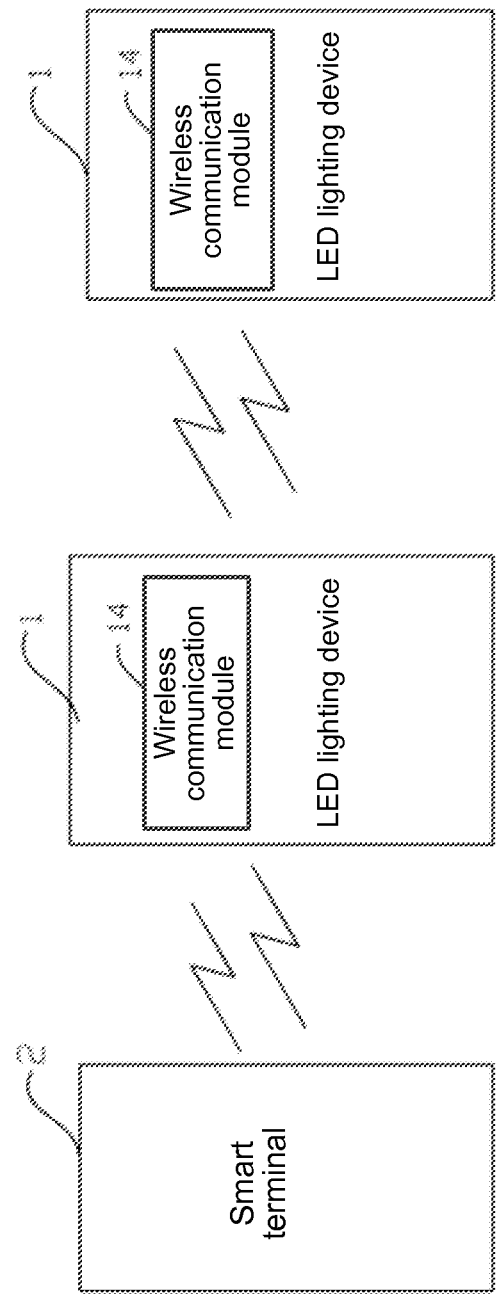
FIG. 3 is another block diagram illustrating an exemplary wireless speaker and LED lighting system consistent with the present disclosure.

FIG. 3 shows another exemplary wireless speaker and LED lighting system consistent with the present disclosure. As shown in FIG. 3, the wireless speaker and LED lighting system may include more than one LED lighting devices 1 so that they may form a speaker system with 2.0, 2.1, 4.1, 5.1, or 7.1 channels. Each of the LED lighting devices 1 includes a wireless communication module 14. Through the wireless communication module 14, multiple LED lighting devices may communicate with each other. Further, using software application installed on the smart terminal 2, one of the LED lighting devices 1 can be configured as the center node, while the other LED lighting devices 1 are configured as receivers. The center node LED lighting device 1 may receive audio signals and control commands wirelessly from the smart terminal 2, and then forward processed signals to the receivers. In some embodiments, the smart terminal 2 may be configured as the center node, and all the LED lighting devices 1 may form a mesh network or a star network controlled by the center node.

In various embodiments, the multifunctional LED device 1 can be configured as one single device. For example, the at least one power supply unit, the wireless communication module, the audio power amplifier unit, the LED light source module, and the speaker unit, can be integrated into the one LED lighting device 1 to form the single device. Accordingly, the multifunctional speaker system can include a plurality of the multifunctional LED lighting devices each configured as one single device.

In an exemplary LED lighting device 1, the speaker unit 13 can be integrated together with driver circuit of the LED power supply unit 11 to save space and to reduce wire loss on of a distributed design. In one embodiment, to ensure wireless communication module 14 functions as the wireless transceiver module as desired, an embedded antenna can be included in the integrated LED lighting device 1. The embedded antenna can be configured to fit a shape of the lamp body of the multifunctional LED device 1 without increasing the size of the resultant device and to maintain the design of the resultant device.

In various embodiments, the wireless communication module 14 may also be configured with automatic frequency hopping functions to avoid interference with other radio devices. Furthermore, noise reduction and/or echo cancellation technologies can be applied using software and hardware products to provide the LED lighting device 1 with desired audio effects.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND
ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In some embodiments, the LED lighting device 1 may include one or more sensors for detecting objects or movements of objects in a room. The LED lighting device 1 may then control the audio and lighting based on the data received from the sensors. For example, in a room using multiple LED lighting devices 1 to implement a wireless multifunctional speaker system, the sensors integrated in the LED lighting devices 1 may detect the position and movements of the a person in the room. The LED lighting and wireless speaker system may then adjust the LED lighting devices 1 close to the person and the LED lighting devices 1 far away from the person accordingly to various algorithms to better broadcast the audio signals. For example, the audio amplifier unit 12 may amplify certain frequency bands in the LED lighting devices 1 close to the person. In another example, the LED lighting device 1 may also adjust the lighting (e g, dimming) in the LED lighting devices 1 far away from the person.

In some embodiments consistent with the present disclosure, an RF module may be added to the LED lighting device and speaker. The RF module may enable users to control the LED lighting device and speaker remotely, such as switching the device on/off, adjusting light and sound settings, etc. The RF module may also connect the LED lighting device and speaker to the internet to stream music online.

In some embodiments consistent with the present disclosure, a Bluetooth module may be included in the LED lighting device and speaker. The LED lighting device and speaker may be paired with a smart phone, a tablet, etc. through the Bluetooth module. A user may install an application on the smartphone or tablet to control lighting or play music stored on the device.

In some embodiments consistent with the present disclosure, multiple LED lighting devices and speakers may be configured to form 2.0-channel, 2.1-channel, 5.1-channel, etc. audio systems. Further, the LED lighting device may be configured to receive commands from the smart device to change its light colors or light intensities according to the rhythm or volume of the music played through the speaker unit.

What is claimed is:
1. An LED lighting device with communication capabilities to connect with a smart terminal, comprising:
  an LED power supply circuit configured to supply power to the LED lighting device;
  an LED light source module configured to emit light, the LED light source module being connected to the LED power supply circuit;
  a wireless communication module configured to receive and process audio signals and commands transmitted from a smart terminal, and control the LED lighting device based on the commands received from the smart terminal, the wireless communication module supporting DLNA protocols;
  an audio power amplifier unit configured to receive processed audio signals from the wireless communication module; and
  a speaker unit configured to play audio signals received from the audio power amplifier unit, the audio amplifier unit driving the speaker unit based on the signals received from the wireless communication module;
  wherein the LED light source module is further configured to change at least one of a light color and a light intensity according to a rhythm and a volume of the audio signals played through the speaker unit based on a command from the smart terminal.

2. The LED lighting device according to claim 1, wherein the wireless communication module supports one or more of 2.4 GHz, 5.2 GHz, and 5.8 GHz frequency bands and the wireless communication module is a full duplex module.

3. The LED lighting device according to claim 1, wherein the smart terminal monitors and controls status of the LED lighting device, and the smart terminal includes a DLNA module.

4. The LED lighting device according to claim 3, wherein the smart terminal communicates with the LED lighting device via DLNA protocols.

5. The LED lighting device according to claim 4, wherein the smart terminal transmits audio signals to the LED lighting device and transmits commands to dim the LED lighting device wirelessly.

6. The LED lighting device according to claim 5, wherein the smart terminal is a smart phone, a smart television, a tablet, or a desktop computer.

7. The LED lighting device according to claim 4, wherein the smart terminal transmits audio signals from an Internet radio station or a music file to the LED lighting device.

8. The LED lighting device according to claim 4, wherein the smart terminal comprises a USB dongle supporting DLNA protocols and the USB dongle transmits audio signals to the LED lighting device.

9. The LED lighting device according to claim 7, wherein the LED lighting device connects to Internet, sends a built-in list of Internet radio stations or a playlist of music to the smart terminal, and then plays audio signals from the Internet radio station or the music selected by the smart terminal.

10. A method for playing audio signals and controlling lighting wirelessly by an LED lighting device, comprising:
  establishing a connection between a smart terminal and the LED lighting device via DLNA protocols, wherein the smart terminal and the LED lighting device include wireless communication modules supporting DLNA protocols;
  controlling lighting of the LED lighting device based on a command received from the smart terminal;
  playing audio signals transmitted from the smart terminal on the LED lighting device; and
  changing at least one of a light color and a light intensity according to a rhythm and a volume of the played audio signals based on a command from the smart terminal.

11. The method according to claim 10, further comprising:
  receiving a command from the smart terminal to connect to Internet;
  sending a built-in list of Internet radio stations or a playlist of music to the smart terminal;
  receiving a selection of an Internet radio station or a music file from the smart terminal; and
  playing audio signals from the selected Internet radio station or the music file.

12. The method according to claim 11, further comprising:
  playing the audio signals from the Internet radio station or music file transmitted to the LED lighting device by the smart terminal.

13. The method according to claim 11, further comprising:

playing the audio signals transmitted to the LED lighting device by a USB dongle supporting DLNA protocols.

14. The method according to claim 11, further comprising:
   receiving a command to dim an LED light source from the smart terminal; and
   dimming the LED light source in the LED lighting device.

15. A wireless multifunctional sound system supporting DLNA protocols, comprising:
   a number of multifunctional LED lighting devices; and
   a smart terminal configured to monitor and remotely control the multifunctional LED lighting devices;
   wherein the smart terminal sets up a first multifunctional LED lighting device as a central device, and the other multifunctional LED lighting device as receiving devices, the central device receiving control signals or audio signals from the smart terminal and sending the signals to the receiving devices;
   and wherein at least one of the multifunctional LED lighting devices change at least one of a light color and a light intensity according to a rhythm and a volume of the received audio signals based on a command from the smart terminal.

16. The wireless multifunctional sound system according to claim 15, wherein the smart terminal controls audio broadcasting and light emission of the multifunctional LED lighting devices using DLNA protocols.

17. The wireless multifunctional sound system according to claim 15, wherein the multifunctional LED lighting devices and the smart terminal form a mesh network.

18. The LED lighting device according to claim 1, further comprising:
   a sensor configured to detect a position and a movement of a person in a surrounding environment.

19. The LED lighting device according to claim 18, wherein:
   the speaker unit is further configured to adjust the playing audio signals based on the position and the movement of the person.

20. The LED lighting device according to claim 19, wherein:
   the LED light source module is further configured to adjust the light intensity based on the position and the movement of the person.

* * * * *